United States Patent [19]

Hagen et al.

[11] Patent Number: 6,067,162
[45] Date of Patent: May 23, 2000

[54] PROCESS FOR MEASURING THE ROUGHNESS OF A MATERIAL SURFACE

[75] Inventors: Werner Hagen, Neuwied; Karlheinz Schaust, Fachbach, both of Germany

[73] Assignee: Honeywell AG, Offenbach am Main, Germany

[21] Appl. No.: 08/676,268

[22] PCT Filed: Dec. 24, 1994

[86] PCT No.: PCT/EP94/04305

§ 371 Date: Nov. 27, 1996

§ 102(e) Date: Nov. 27, 1996

[87] PCT Pub. No.: WO95/18952

PCT Pub. Date: Jul. 13, 1995

[30] Foreign Application Priority Data

Jan. 7, 1994 [EP] European Pat. Off. ............ 94100144

[51] Int. Cl.[7] ............ G01B 11/24; G01B 11/30; G01N 21/84

[52] U.S. Cl. ............ 356/376; 356/371; 356/429
[58] Field of Search ............ 356/429, 371, 356/446

[56] References Cited

U.S. PATENT DOCUMENTS 3,922,093 11/1975 Danliker et al. ............ 356/371

*Primary Examiner*—Frank G. Font
*Assistant Examiner*—Amanda Merlino
*Attorney, Agent, or Firm*—Anthony Miologos; Arthur A. Sapelli

[57] ABSTRACT

In order to measure the roughness of the surface of a material, in particular of a paper web, the surface of the material is illuminated with a parallel bundle of light beams and the scattering ellipse of the reflected light is evaluated. According to the invention, on optically rough surfaces the evaluation with respect to the scattering ellipse is done in a direction deviating from the major axis of the scattering ellipse.

3 Claims, 1 Drawing Sheet

PROCESS FOR MEASURING THE ROUGHNESS OF A MATERIAL SURFACE

BACKGROUND OF THE INVENTION

1. Field of the Invention

The present invention relates to a method for measuring the roughness of the surface of a material and more particularly to a method of measuring the roughness of a material surface by measuring a light scattering ellipse reflected off the surface along the scattering ellipse's minor axis.

2. Discussion of the Related Art

Such a method is known from Swiss patent 552 197. Moreover, it is proposed to use a line of detectors along the major axis of the scattering light ellipse which arises in the event where the surface of the material shows a certain roughness and is illuminated by a bundle of parallel light beams under a predetermined angle. Preferably there the scattering light cone at the half width in the vicinity of the glancing angle is measured and is used as a measure for the roughness of the investigated surface. Furthermore, an evaluation using a television camera instead of an evaluation with a line of detectors is described.

The evaluation of the roughness is of remarkable importance at the manufacturing of paper since the roughness or reciprocally the smoothness gives evidence about the printability of the paper.

In the known device it must be cared for that at the location of the illumination of the web of material by the bundle of light beams this web has to be guided in such a way that due to the movement no too large positional changes result in the plane where the web of material extends in order to avoid that the scattering light ellipse is moving out of the scanning area of the detector. The same problem results where the surface to be measured is too rough so that the scattering light distribution within the major axis of the scattering light ellipse is exceeding the scanning field as provided by the line of detectors or the television camera, respectively.

BRIEF SUMMARY OF THE INVENTION

Therefore, it is the object of the present invention to develop the method as exercised by the known device in such a way that the roughness of very rough surfaces still may also be detected. The solution of this object is achieved by a method for measuring the roughness of the surface of a material, such as a paper web, traveling in a first direction. The surface of the material is illuminated by a bundle of parallel light beams at a glancing angle, causing the light reflected off the surface of the material to form a scattering ellipse of reflected light whose major axis is parallel to the direction of the material travel and which is evaluated by detector means oriented along the major axis of the scattering ellipse, whereby the evaluation of the roughness of the surface of the material includes the step of deviating the detector means away from the major axis of the scattering ellipse toward a minor axis that is perpendicular to the travel of the material. Further advantageous embodiments of the inventive method may be taken from the dependent claims.

BRIEF DESCRIPTION OF THE SEVERAL VIEW OF THE DRAWINGS

With respect to embodiments shown in the attached drawings the invention shall be further explained in the following. It shows:

FIG. 1 the basic measuring device; and

FIG. 2 a schematic drawing for explaining the method according to the invention.

DETAILED DESCRIPTION OF THE INVENTION

Figure 1:
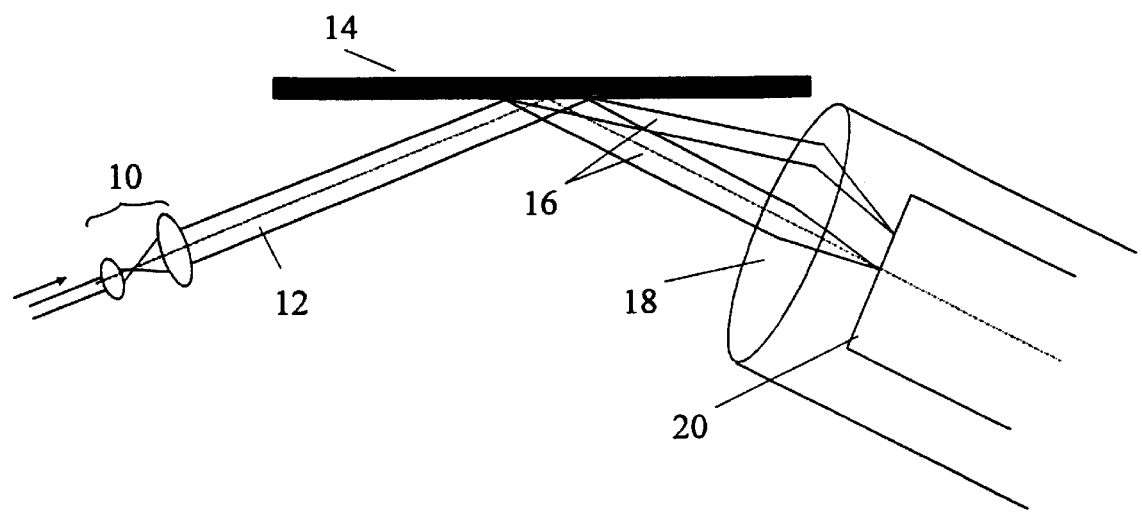

According to FIG. 1, the surface 14 to be investigated is illuminated by means of a collimated bundle of light beams 12 which are expanded by a telescopic means 10. The beams 16 reflected from the rough surface 14 via an optic means 18 are projected onto a receiver 20 which may consist of a line-shaped or an aerial detector device and in particular may be provided by a line or aerial camera (Vidicon or CCD).

Figure 2:
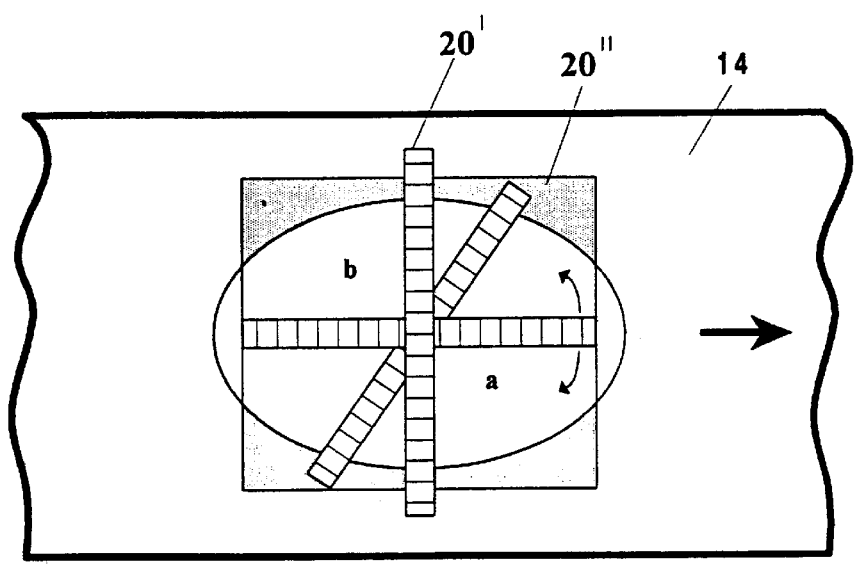

According to FIG. 2, it may be taken that a line camera 20' where it is aligned along the direction of movement of the surface 14 as shown by the arrow does not completely encompass the major axis of the scattering light ellipse in the event where the material shows a great roughness and the scattering ellipse is accordingly expanded. Rotation of the line camera 20' with respect to the major axis a by a predetermined angle allows again to pick up the scattering light ellipse. Preferably rotation of the line camera 20' is done in such a way that it coincides with the minor axis b of the scattering light ellipse. The evaluation of the half-width as a measure for the roughness of the surface then may be implemented with respect to the minor axis b of the scattering light ellipse.

Furthermore, it may be taken from FIG. 2 that with the use of an aerial camera 20" this camera still is able to evaluate the scattering light ellipse with respect to the minor axis b if one compiles the sensor elements of the aerial camera for a line scanning parallel to the direction of movement of the surface 14 as this is shown by some shown scanning lines. The present invention has been described with particular reference to the preferred embodiments thereof. It will be obvious that various changes and modifications can be made therein without departing from the spirit and scope of the invention as defined in the appended claims.

What is claimed is:

1. A method for measuring the roughness of the surface of a material traveling in a first direction, whereat the surface of the material is illuminated by means of a parallel bundle of light beams to form a scattering ellipse of reflected light whose major axis is parallel to the first direction of material travel and the scattering ellipse of the reflected light is evaluated by detector means, wherein the evaluation of the scattering ellipse includes the step of:

deviating the detector means in a direction away from the major axis of the scattering ellipse transverse to the first direction of material travel.

2. The method according to claim 1, wherein the detector means comprises a line camera and in the evaluation step the line camera is rotated to deviate the line camera with respect to the major axis of the scattering ellipse.

3. The method according to claim 1 wherein the detector means comprises an aerial camera, and in the evaluation step scanning of the scattering ellipse by the aerial camera is done in a direction deviating from the major axis of the scattering ellipse.

* * * * *